United States Patent [19]

Tomisawa

[11] Patent Number: 5,014,548

[45] Date of Patent: May 14, 1991

[54] METHOD AND APPARATUS FOR DETECTING DETERIORATION OF SUCKED AIR FLOW QUANTITY-DETECTING DEVICE OF ENGINE

[75] Inventor: Naoki Tomisawa, Isesaki, Japan

[73] Assignee: Japan Electronic Control Systems, Co., Ltd., Isesaki, Japan

[21] Appl. No.: 540,618

[22] Filed: Jun. 20, 1990

[30] Foreign Application Priority Data

Jun. 20, 1989 [JP] Japan .................................. 1-155692

[51] Int. Cl.[5] ........................................... G01M 15/00
[52] U.S. Cl. .................................................. 73/118.1
[58] Field of Search ...................... 73/3, 118.1, 118.2; 364/507, 550, 551; 340/635, 653

[56] References Cited

U.S. PATENT DOCUMENTS 4,594,987 6/1986 Wataya et al. ..................... 73/118.2
4,836,016 6/1989 Nakano et al. ..................... 73/118.1
4,930,079 5/1990 Kondo ................................ 73/118.1

FOREIGN PATENT DOCUMENTS 60-240840 11/1985 Japan .

Primary Examiner—Robert Raevis
Attorney, Agent, or Firm—Foley & Lardner

[57] ABSTRACT

Disclosed are a method and apparatus for detecting deterioration of a sucked air flow quantity-detecting device of an engine, in which during a predetermined period after the start of use of the engine, detected values of sucked air flow quantities detected by the sucked air flow quantity-detecting device are learned for respective areas of the engine driving state, and then, the detected value of the sucked air flow quantity detected by the air flow quantity-detecting device is compared with the learned value and deterioration of the sucked air flow quantity-detecting device is judged when the difference is larger than a predetermined value.

5 Claims, 2 Drawing Sheets

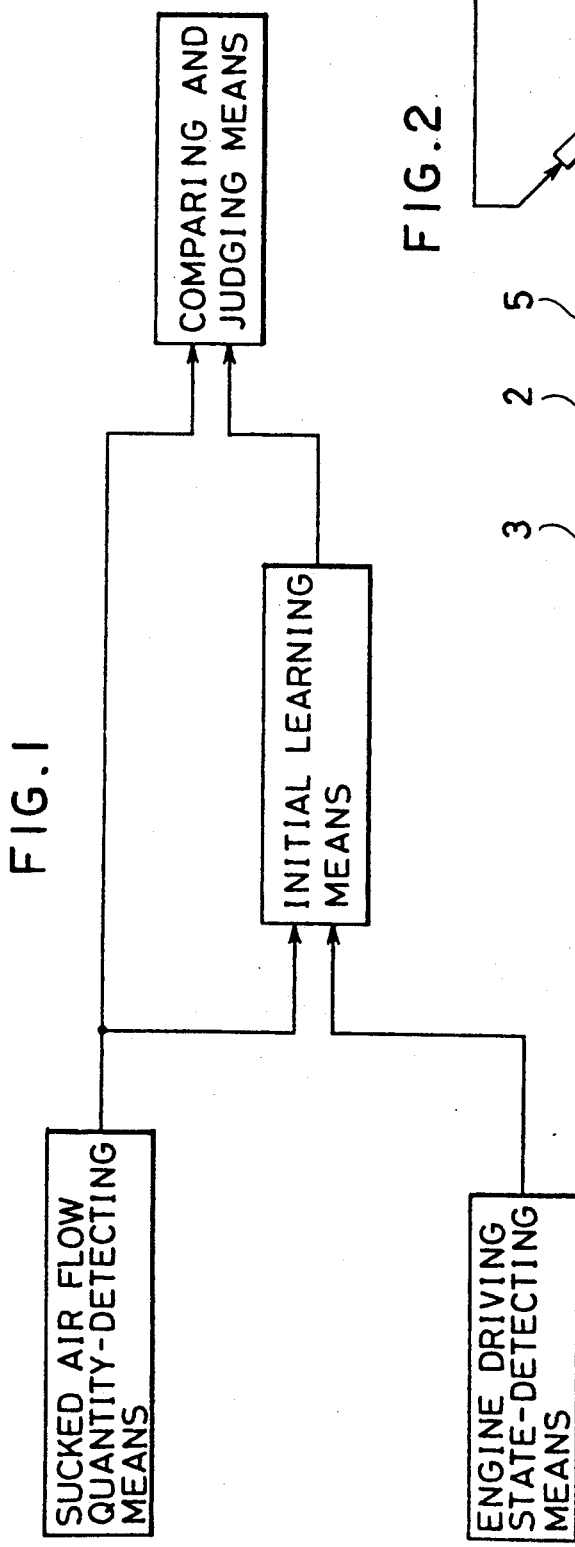
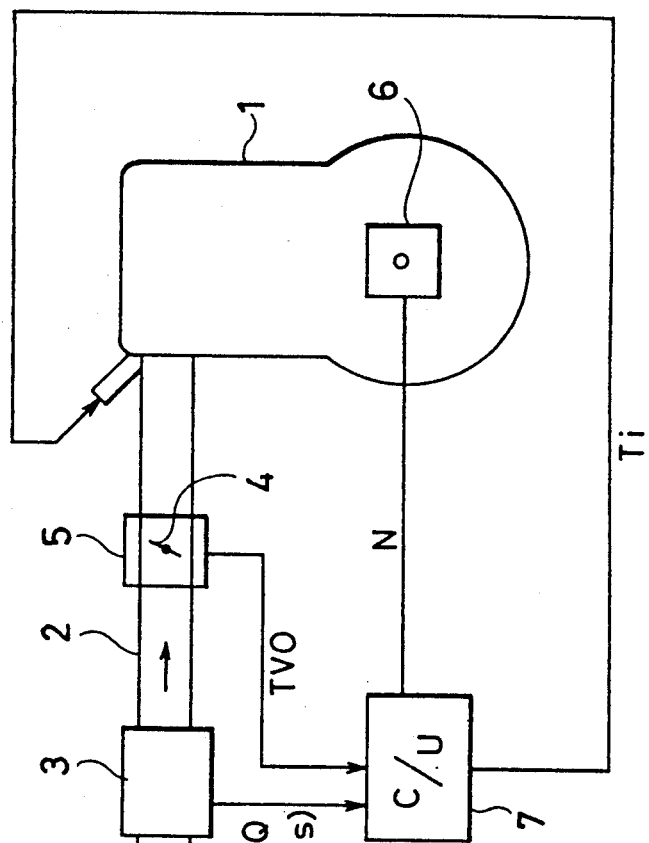

METHOD AND APPARATUS FOR DETECTING DETERIORATION OF SUCKED AIR FLOW QUANTITY-DETECTING DEVICE OF ENGINE

BACKGROUND OF THE INVENTION (1) Field of the Invention

The present invention relates to a method and apparatus for detecting deterioration of sucked air flow quantity-detecting device used in an electronically controlled fuel injection system of an internal combustion engine.

(2) Description of the Related Art

As the conventional electronically controlled fuel injection system, for example, the following system can be mentioned (see Japanese Unexamined Patent Publication No. 60-240840).

Namely, a flow quantity Q of air sucked in an engine is detected based on a signal (voltage) emitted from a sucked air flow quantity-detecting device such as a flap type flow meter or not-wire type flow meter, and in a control unit, a basic fuel injection quantity Tp ($=K \cdot Q/N$; K is a constant) is calculated from this sucked air flow quantity Q and an engine revolution number N calculated from an ignition signal to an ignition coil or a crank angle signal from a crank angle sensor.

Then, this basic fuel injection quantity is corrected by various correction coefficient COEF corresponding to the cooling water temperature and the like and a voltage correction component Ts corresponding to the battery voltage and the final fuel injection quantity Ti ($=Tp \cdot COEF + Ts$) is thus calculated.

A driving pulse signal having a pulse width corresponding to the above-mentioned fuel injection quantity Ti is emitted at a timing synchronous with the revolution of the engine to drive and open a fuel injection valve and effect injection of a fuel.

In the conventional system, at the idle driving of the engine, for example, when an idle switch is turned on, an upper limit level I of the sucked air flow quantity Q, which is larger by $\Delta Q1$ than the sucked air flow quantity Q at the idle driving and cannot be reached in the idle state, is set, and if the sucked air flow quantity Q exceeds this upper limit level I, it is presumed that a disorder has taken place. When the idle switch turned off, in the driving region where the engine is not in the idle state, a lower limit level II of the sucked air flow quantity Q, which is smaller by $\Delta Q2$ than the sucked air flow quantity Q at the idle driving and below which the sucked air flow quantity Q does not decrease even in the idle state, is set, and if the sucked air flow quantity Q is lower than this lower limit level II, it is presumed that a disorder has taken place in the sucked air flow quantity-detecting device.

In this conventional disorder-detecting method, however, although an absolute disorder of the sucked air flow quantity-detecting device can be detected, a long-lasting deterioration which has not reached an absolute trouble is variation included within the ranges of $\Delta Q1$ and $\Delta Q2$ and hence, cannot be detected. This deterioration has serious influences on the exhaust gas-purging performance of a vehicle and it is difficult to maintain a good exhaust gas-purging performance of a vehicle for a long time.

Of course, it is considered that such a cumulative deterioration will be detected by setting smaller values for $\Delta Q1$ and $\Delta Q2$. However, according to this method, even an inherent dispersion of the sucked air flow quantity-detecting device, a change of the atmospheric pressure irrelevant to the sucked air flow quantity-detecting device, or contamination or clogging of the suction system is erroneously judged as the deterioration.

SUMMARY OF THE INVENTION

It is a primary object of the present invention to solve the foregoing problems and provide a method and apparatus for detecting deterioration of a sucked air flow quantity-detecting device, in which deterioration of the sucked air flow quantity-detecting device can be detected without an erroneous judgement even if the detecting device has been deteriorated cumulatively for a long time from the start of use.

In accordance with the present invention, the foregoing object can be attained by a method for detecting deterioration of a sucked air flow quantity-detecting device, which comprises the following steps (a) through (c):

(a) the step of detecting the driving state of an engine;

(b) the step of learning the detected value of the sucked air flow quantity detected by the sucked air flow quantity-detecting device for each area of a predetermined range of the engine driving state during a predetermined period of the initial stage of use of the engine, and (c) the step of comparing the detected value of the sucked air flow quantity detected by the sucked air flow quantity-detecting device with the learned value stored in correspondence to the area of the detected engine driving state and judging deterioration when the difference is larger than a predetermined value.

Furthermore, in accordance with the present invention, there is provided an apparatus for detecting deterioration of a sucked air flow quantity-detecting device, which comprises the following means (d) through (f):

(d) engine driving state-detecting means for detecting the driving state of an engine;

(e) initial learning means for learning the detected value of the air flow quantity detected by the sucked air flow quantity-detecting device for each area of a predetermined range of the engine driving state during a predetermined period of the initial stage of use of the engine; and (f) comparing means for comparing the detected value of the sucked air flow quantity detected by the sucked air flow quantity-detecting device with the learned value stored by the initial learning means in correspondence to the area of the detected engine driving state and judging deterioration when the difference is larger than a predetermined value.

It is preferred that the means (d) be constructed so that the engine revolution number and the opening degree of a throttle valve be detected as parameters of the engine driving state.

It also is preferred that the means (e) be constructed so that the predetermined period for the learning ranges from the point of the start of use of the engine to the point when the learned values of sucked air flow quantities are obtained with respect to all of areas of the engine driving state.

Furthermore, it is preferred that the means (e) be constructed so that the learning is carried out while the learned value Qo is renewed based on the detected value of the sucked air flow quantity according to the following equation:

$$Q_o \leftarrow Q_o + (Q - Q_o)/M$$

wherein Qo of the right side is the precedent learned value, Qo of the left side is the renewed learned value, Q represents the detected value, and M is a weighting constant.

In the above-mentioned structure, sucked air flow quantities detected by the sucked air flow quantity-detecting device are learned for respective areas of predetermined ranges of the driving state of the engine in the initial stage of use of the engine, and then, the detected value of the sucked air flow quantity detected by the sucked air flow quantity-detecting device is compared with the learned value and deterioration is judged when the difference is larger than a predetermined value.

By the above-mentioned structure, when deterioration of the sucked air flow quantity-detecting means takes place by long-period use, this is detected and it becomes possible to exchange parts promptly just in time and prevent degradation of the exhaust gas-purging performance of a vehicle.

An especially high effect is attained when the engine revolution number and the opening degree of the throttle valve are detected as factors of the engine driving state.

Moreover, a high effect can be attained when the predetermined time for the learning is extended until learned value of all the areas are obtained.

Furthermore, since in the learning of the sucked air flow quantity, a new stored value is set by using a weighting constant, influences of noises can be avoided.

The characteristic structure of the present invention and the function attained by this structure will now be described in detail with reference to one embodiment illustrated in the accompanying drawings.

BRIEF DESCRIPTION OF THE DRAWINGS

FIG. 1 is a functional block diagram illustrating the structure of the present invention.

FIG. 2 is a system diagram illustrating one embodiment of the present invention.

DETAILED DESCRIPTION OF THE PREFERRED EMBODIMENT

Figure 3:
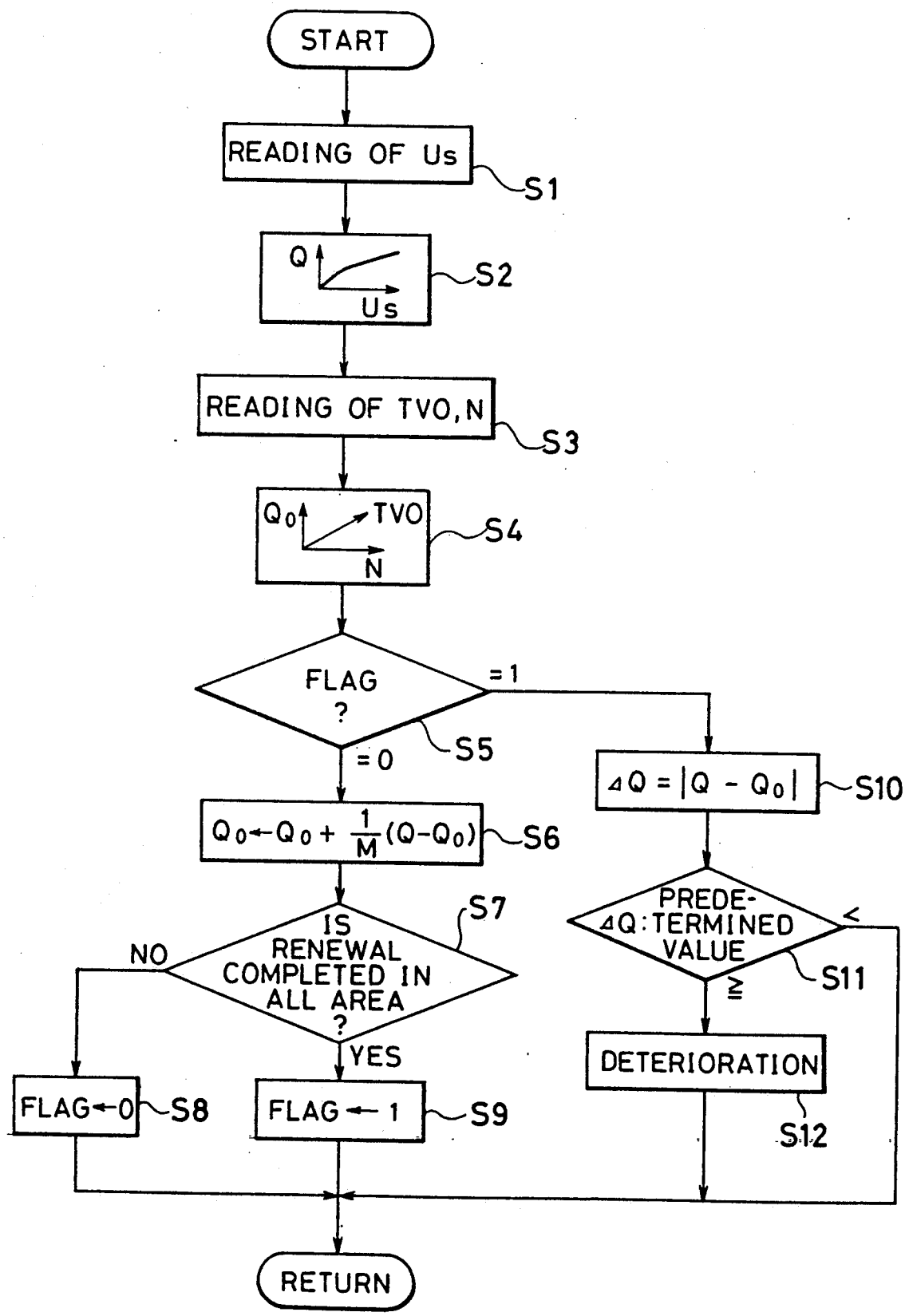
FIG. 3 is a flow chart showing the contents of the control.

The outline of the present invention is as shown in FIG. 1, and one embodiment is illustrated in FIGS. 2 and 3.

The system of the present embodiment will now be described with reference to FIG. 2.

On the upstream side of a suction path 2 of an engine 1, there is disposed sucked air flow quantity-detecting device (hereinafter referred to as "air flow meter") 3 generating a voltage Us corresponding to the sucked air flow quantity Q. On the downstream side of the suction path 2, there is disposed a throttle valve 4 to which a throttle sensor 5 for detecting the opening degree of the throttle valve 4 is attached. Furthermore, an engine revolution number sensor 6 for detecting the engine revolution number N as the engine revolution speed, such as a crank angle sensor, is disposed in the engine 1.

The sucked air flow quantity Q, the opening degree TVO of the throttle valve and the engine revolution number N are put into a control unit 7. The routine shown in FIG. 3 is executed in the control unit 7 at every predetermined time to detect deterioration of the air flow meter 3.

The routine shown in FIG. 3 will now be described.

At step 1 (expressed as S1 in the drawings; subsequent steps are similarly expressed), the output voltage Us of the air flow meter 3 is received, and at step 2, the output voltage Us is converted to the sucked air flow quantity by using a map.

At step 3, the opening degree TVO of the throttle valve detected by the throttle sensor 5 and the engine revolution number N detected by the engine revolution number sensor 6 are received.

This step 3 corresponds to the engine driving state-detecting means.

At step 4, the sucked air flow quantity Qo corresponding to the present driving state is retrieved from a map where the sucked air flow quantity Qo is learned and stored for each area of the engine driving state sorted by the engine revolution number N and the opening degree TVO of the throttle valve, as described hereinafter.

At step 5, the flag is checked, and when the flag is at 0, the routine goes into step 6 and the difference between the sucked air flow quantity Q retrieved at step 2 and the sucked air flow quantity Qo is added at a predetermined ratio to the sucked air flow quantity Qo retrieved at step 4 according to the following equation, and the sucked air flow quantity Qo stored in the map is renewed by the obtained new sucked air flow quantity Qo:

$$Q_o \leftarrow Q_o + (Q - Q_o)/M$$

wherein M is a weighting constant of at least 1.

At step 7, it is judged whether or not the renewal is completed with respect to all the areas, and when it is judged that the renewal is not completed, the routine goes into step 8, and the flag is held at 0 and the routine is ended. When it is judged that the renewal is completed, the routine goes into step 9, and the flag is set at 1 and the routine is ended.

These steps 5 through 8 corresponds to the initial learning means.

Furthermore, when it is judged at step 5 that the flag is set at 1, the routine goes into step 10, and the absolute value ΔQ of the difference between the value Q detected at step 2 and the stored value Qo at step 4 is calculated.

At step 11, the obtained value ΔQ is compared with a predetermined value, and if the value Q is larger than the predetermined value, deterioration is judged at step 12, and the routine is ended.

When it is judged at step 11 that the value ΔQ is smaller than the predetermined value, the routine is ended.

When deterioration is judged, a driver is informed of deterioration, for example, by lighting a warning lamp.

These steps 10 through 12 correspond to the comparing and judging means.

As is apparent from the foregoing description, according to the present invention, in the initial stage of use of the engine, based on the newest detected value, the stored value Qo is renewed and learned over the entire region so that both the values are equal to each other, and thus, the inherent initial dispersions of the engine are absorbed. Then, the learning is stopped, and by comparing the detected value Q with the stored value Qo, long-lasting deterioration of the air flow meter caused by long-time use of the engine can be detected.

In the present embodiment, the map of sucked air flow quantities of respective engine driving state is backed up even when the power source of the engine is turned off, but a lithium battery can be exclusively used for the map.

In the foregoing embodiment, the engine driving number N and the opening degree TVO of the throttle valve are used for knowing the driving state of the engine, but there can be adopted a method in which the change of the sucked air pressure is detected by a pressure sensor disposed downstream of the throttle valve in the suction path and the driving state of the engine is known from the pressure of sucked air and the engine revolution number.

As is apparent from the foregoing description, according to the present invention, when deterioration of the air flow meter is caused by long-time use, this deterioration is detected, and parts can be exchanged promptly just in time and degradation of the exhaust gas-purging performance of a vehicle can be prevented. This is an effect attained by the present invention.

I claim:

1. A method for detecting deterioration of sucked air flow quantity-detecting device of an engine, which comprises the step of detecting the driving stage of the engine, the step of learning the detected value of the sucked air flow quantity detected by the sucked air flow quantity-detecting device for each area of a predetermined range of the engine driving state during a predetermined period of the initial stage of use of the engine and the step of comparing the detected value of the sucked air flow quantity detected by the sucked air flow quantity-detecting device with the learned value stored in correspondence to the area of the detected engine driving state and judging deterioration when the difference is larger than a predetermined value.

2. An apparatus for detecting deterioration of a sucked air flow quantity-detecting device of an engine, which comprises engine driving state-detecting means for detecting the driving state of the engine, initial learning means for learning the detected value of the sucked air flow quantity detected by the sucked air flow quantity-detecting device for each area of a predetermined range of the engine driving state during a predetermined period of the initial stage of use of the engine, and comparing means for comparing the detected value of the sucked air flow quantity detected by the sucked air flow quantity-detecting device with the learned value stored by the initial learning means in correspondence to the area of the detected engine driving state and judging deterioration when the difference is larger than a predetermined value.

3. An apparatus for detecting deterioration of a sucked air flow quantity-detecting device of an engine according to claim 2, wherein the engine driving state-detecting means detects the engine revolution speed and the opening degree of a throttle valve as parameters of the engine driving state.

4. An apparatus for detecting deterioration of a sucked air flow quantity-detecting device of an engine according to claim 2, wherein the predetermined period for the learning by the initial learning means ranges from the point of the start of use of the engine to the point when learned values of the sucked air flow quantities are obtained with respect to all the areas of the engine driving state.

5. An apparatus for detecting deterioration of a sucked air flow quantity-detecting device of an engine according to claim 2, wherein the initial learning means performs learning while renewing the learned value Qo based on the detected value of the sucked air flow quantity according to the following equation:

$$Q_o \leftarrow Q_o + (Q - Q_o)/M$$

wherein Qo of the right side is the precedent learned value, Qo of the left side is the renewed learned value, Q represents the detected value, and M is a weighting constant.

* * * * *